(12) United States Patent
Keating

(10) Patent No.: US 8,008,813 B2
(45) Date of Patent: Aug. 30, 2011

(54) SYSTEMS AND METHODS FOR AN IMPROVED LINEAR MOTOR

(76) Inventor: Kyle Lee Keating, Lafayette, CA (US)

( * ) Notice: Subject to any disclaimer, the term of this patent is extended or adjusted under 35 U.S.C. 154(b) by 298 days.

(21) Appl. No.: 12/369,726

(22) Filed: Feb. 11, 2009

(65) Prior Publication Data

US 2010/0201209 A1   Aug. 12, 2010

(51) Int. Cl.
*H02K 41/00*   (2006.01)
*H04R 25/00*   (2006.01)

(52) U.S. Cl. ............ 310/12.14; 381/412; 381/422; 381/419

(58) Field of Classification Search ......... 310/12.14, 310/12.16; 381/150, 400, 409, 410, 408, 381/412, 414, 419, 421, 422
See application file for complete search history.

(56) References Cited

U.S. PATENT DOCUMENTS 5,594,805 A * 1/1997 Sakamoto et al. ............ 381/412
7,492,918 B2 * 2/2009 Stiles et al. .................... 381/409

OTHER PUBLICATIONS

Adire Audio, Technical Paper, 2006, http://www.adireaudio.com, Lynnwood, WA, U.S., 4 pages.
ECLIPSE, Technical Paper, SW8000 Series, 2008, http://eclipse-web.com/sw/linear.html, 1 page.
Keating, K.L., "Linear Force Conductor" whitepaper and linear transducer design practice and theory, University of California San Diego, Jul. 2008, 26 pages.
Mowry, S., Steallus, Part 1, Voice Coil, 2007, pp. 1-4.
Mowry, S., Steallus, Part 2, Voice Coil, 2007, pp. 1-8.

* cited by examiner

*Primary Examiner* — Quyen Leung
*Assistant Examiner* — Leda Pham
(74) *Attorney, Agent, or Firm* — Kang Lim

(57) ABSTRACT

An improved linear motor is provided useful in conjunction with audio equipment for reduced distortion audio output at high voice coil displacements. The improved linear motor may include a yoke, a gap plate which forms an air gap with the yoke, magnets coupled to the yoke and the gap plate, a former, and a voice coil coupled to the former. The magnets generate a magnetic field across the air gap, which is relatively narrow. The former and coil fit in the air gap and may move in a vertical direction. The voice coil includes more than one segment, each having differing electrical resistance. The differing resistances cause the force on the voice coil to be uniform regardless of displacement of the voice coil vertically within the air gap. Resistance differences between the segments may be caused by differing the wire lengths making up each segment of the coil. Likewise, each segment may be made of differing material to vary resistance.

20 Claims, 18 Drawing Sheets

SYSTEMS AND METHODS FOR AN IMPROVED LINEAR MOTOR

BACKGROUND OF THE INVENTION

The present invention relates to an improved linear motor. More particularly, the present invention relates to a linear motor which utilizes a variable resistance voice coil to generate a linear motor while still achieving high efficiency.

Linear motors are extensively used today for transducers for audio equipment. In addition to use in audio equipment, linear motors have applications in machinery, transportation, weapons design, and mass accelerators.

As illustrated at FIG. 1, a standard Alternating Current (AC) motor system typically includes a steel return circuit, a t-yoke and a gap plate, and a magnetic source. The most common motors use ceramic magnets, but any magnetic source may be used. Steel is ideal for the return circuit because it has high magnetic permeability. The magnets generate a Magnetic Field (B). The flux path of the magnetic field generally contours along the steel path and across an air gap which exists between the gap plate and the t-yoke. The air gap is generally extremely small such to minimize loss through the less permeable air.

A voice coil, or coil, (a current carrying conductor) resides inside the non-uniform magnetic air gap. As current is driven through the voice coil, the coil experiences a force perpendicular to the current direction.

However, the magnetic field generated in the linear motor is not uniform. The non-uniform flux density of the xz-plane (orthogonal to the motion of the driver) is irrelevant for linear conductor studies because the flux lines are concentric about a symmetrical cylinder. Moreover, differences in Magnetic Field (B) on the Length (L) of the voice coil wire between the outside edge of a voice coil and the inside edge symmetrical balance out when summed across the entire coil.

However, a non-uniform field in the y-axis, which causes non-linear force as the coil moves through the fixed non-linear magnetic field, has a significant effect on voice coil fidelity and distortion. Thus, when the bottom or top of the coil nearly reaches the bottom or top of the gap, respectively, at ultra high displacement, the relative force generated on the active coil is drastically reduced.

This non-linear force problem arises when the voltage applied to the voice coil is high, or the period is very long (low frequency input) which, in either case, causes displacement beyond linear tolerances.

Many driver types have been designed to make the force on the voice coil more linear as a function of displacement. Traditional designs have included overhung and underhung type designs. Overhung refers to a shorter gap plate and a longer coil that extends beyond the gap at all times. In an underhung design there is a taller gap and a shorter coil that always sit inside this gap (never extends above or below). The idea is to create a difference between the coil and gap such that when the driver moves up and down, coupling between magnetic flux and coil can be maintained at all displacements at all times. All things being equal, overhung coils tend to have higher force factors, but underhung coils tend to be more linear but much less efficient when designed to have the same voice coil height to gap height differential.

In addition to these traditional designs, modern dual gap motors and variable coil motors have been designed to linearize force as displacement of the voice coil occurs. Examples of these motor designs include XBL$^2$ TM designed by Senior Transducer Engineer Dan Wiggins, the LMS designed by Senior Transducer Engineer Thilo Stompler, and the Split Coil, an open source design. See FIGS. 13, 14 and 15 for examples of double gap, variable coil and split coil designs respectively.

While these current modern methods go far to generate relative linear force regardless of displacement, they do so at the expense of efficiency. For many audio applications low energy usage is extremely important. Thus, efficiency of the transducer becomes crucial. Likewise, reduced efficiency of a linear motor results in decreased sensitivity and lower overall output.

Hence there is a need for an improved linear motor system and method. Such a system may provide linear force on the voice coil regardless of displacement while maintaining a high degree of efficiency. Such a system may enable a linear motor with reduced distortion where reduced distortion motors were previously impractical due to low sensitivity.

SUMMARY OF THE INVENTION

To achieve the foregoing and in accordance with the present invention, an improved linear motor is provided. Such an improved linear motor may be useful in conjunction with audio equipment for reduced distortion audio output even at high voice coil displacements.

One embodiment of the improved linear motor is used in conjunction with a voltage input. The improved linear motor may include a yoke which is permeable to a magnetic field, a gap plate which forms an air gap with the yoke, magnets coupled to the yoke and the gap plate, a former, and a voice coil coupled to the former.

The magnets generate a magnetic field across the air gap, which is relatively narrow. The gap plate is permeable to the magnetic field to assist in generating the magnetic field across the air gap. The voice coil fits in the air gap and may move in a vertical direction.

Of note is that the voice coil includes more than one segment. Each segment of the voice coil may have differing electrical resistance. The differing resistances cause the force on the voice coil to be uniform regardless of displacement of the voice coil vertically within the air gap. Resistance differences between the segments may be caused by differing the wire lengths making up each segment of the coil. Likewise, each segment may be made of differing material to vary resistance.

In some embodiments the voice coil includes four resistive segments. These voice coil segments include a top outside segment, a top center segment, a bottom center segment and a bottom outside segment. The top outside segment and the bottom outside segment have a lower resistance than the top center segment and the bottom center segment. Moreover, the top outside segment interlaces with the top center segment, and the bottom center segment interlaces with the bottom outside segment.

In an alternate embodiment, the voice coil includes three resistive segments. These voice coil segments include a top outside segment, a center segment, and a bottom outside segment. The top outside segment and the bottom outside segment have a lower resistance than the center segment, and the top outside segment and the bottom outside segment interlace with the center segment.

Note that the various features of the present invention can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

Figure 1A:
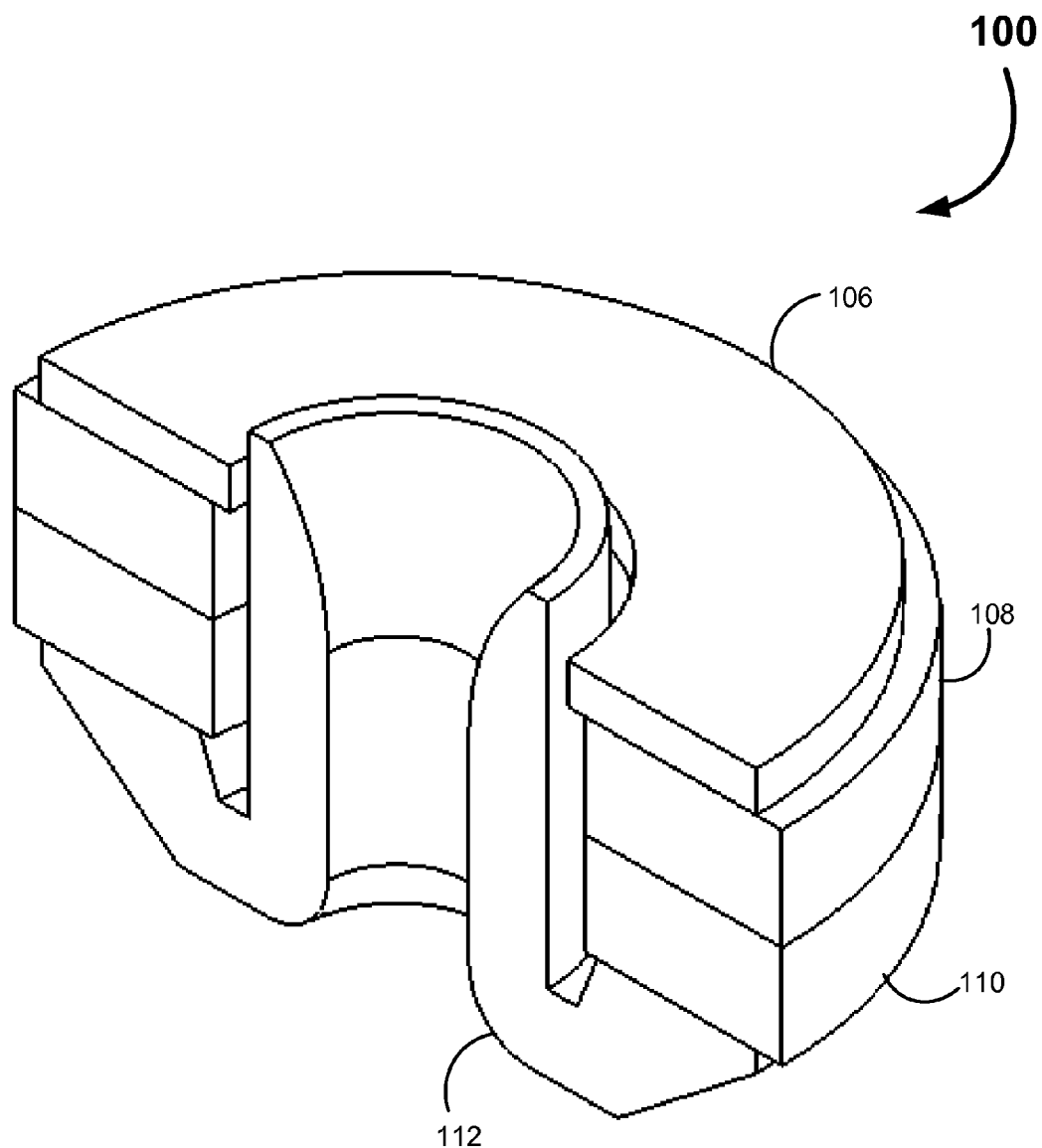
FIG. 1A shows a isometric cutaway illustration of a linear motor geometry, excluding the voice coil, in accordance with an embodiment of the present invention.

To facilitate discussion, FIG. 1A shows an isometric cutaway illustration of Improved Linear Motor 100 geometry, excluding the voice coil, in accordance with an embodiment of the present invention.

The illustrated Improved Linear Motor 100 is similar to a standard Alternating Current (AC) motor system in that it includes a return circuit which includes a Yoke 112 and a Gap Plate 106, and a one or more Magnets 108 and 110. As with most common motors, the one or more Magnets 108 and 110 may include ceramic magnets, but any magnetic source may be used. The Gap Plate 106 and Yoke 112 may be composed of steel for its high magnetic permeability; however other materials, including other metal alloys, may be utilized.

Typically the Improved Linear Motor 100 is cylindrical, however other shapes are considered. In general, symmetry in the xz plane is desirous, thereby eliminating concerns with non-uniform magnetic flux densities and the force effects on the voice coil in this plane.

Additionally, the contemplated Improved Linear Motor 100 may be a variety of sizes, from extremely small 'tweeter' type transducers to large industrial 'subwoofer' type transducers. Likewise, it is considered that other geometries of the Improved Linear Motor 100 are possible as the use of the Improved Linear Motor 100 dictates. For example, the illustrated exemplary embodiment of the Improved Linear Motor 100 may be desirous for transducer equipment for the audio field; however, a multiple magnet elongated design for the Improved Linear Motor 100 may be more desirous for transportation type linear motors, such as those used in Maglev trains or linear actuators.

Figure 1B:
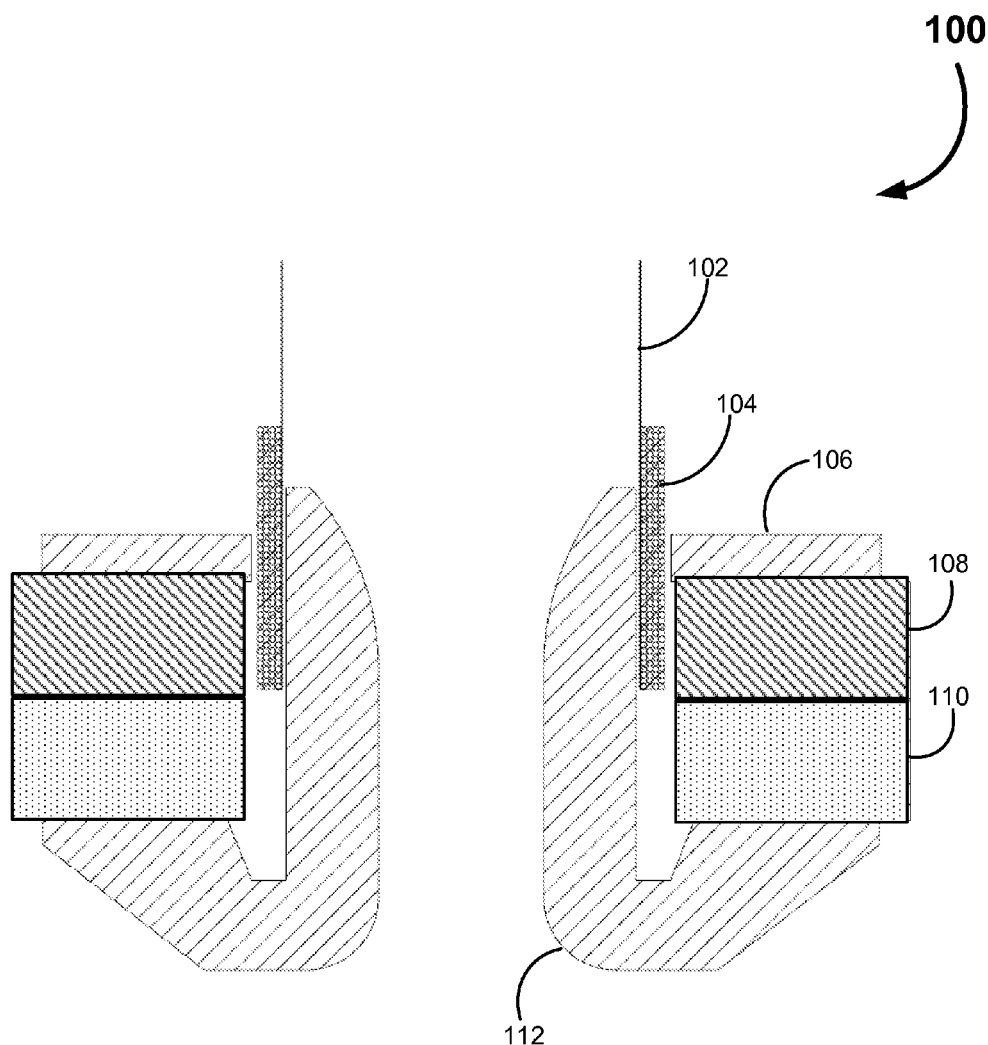
FIG. 1B shows a cross sectional illustration of a linear motor geometry in accordance with an embodiment of the present invention.

FIG. 1B shows a cross sectional illustration of the Improved Linear Motor 100. In addition to the Gap Plate 106, Magnets 108 and 110, and Yoke 112, here the Voice Coil 104 may be seen. The Voice Coil 104 may be wound about a Former 102. The Former 102 typically is cylindrical or conical in shape; however, any appropriate shape for the Former 102 may be utilized.

The Former 102 and Voice Coil 104 may be configured to vertically move in relation to the Yoke 112, Magnets 108 and 110, and the Gap Plate 106. In an audio transducer device, the top of the Former 102 may be coupled to a membrane or cone. Thus, as the Voice Coil 104 and Former 102 shift position, the membrane or cone will likewise shift, displacing air and generating a sound wave. Likewise, sound waves may shift the membrane or cone, causing the Former 102 and Voice Coil 104 to move vertically, as is common in a microphone, as is well known by those skilled in the art of audio systems design.

In some embodiments, the Improved Linear Motor 100 may be used for other purposes such as weapons design, transportation, robotic machinery, media, and rotary purposes. In these embodiments, the Former 102 may couple to munitions or the transport vehicle, respectively. The thrust of the present invention is to generate a linear motor with efficient linear force output across a working range. Use of such an improved linear motor is intended to include all present uses, and foreseeable future uses, of linear motors.

Figure 2:
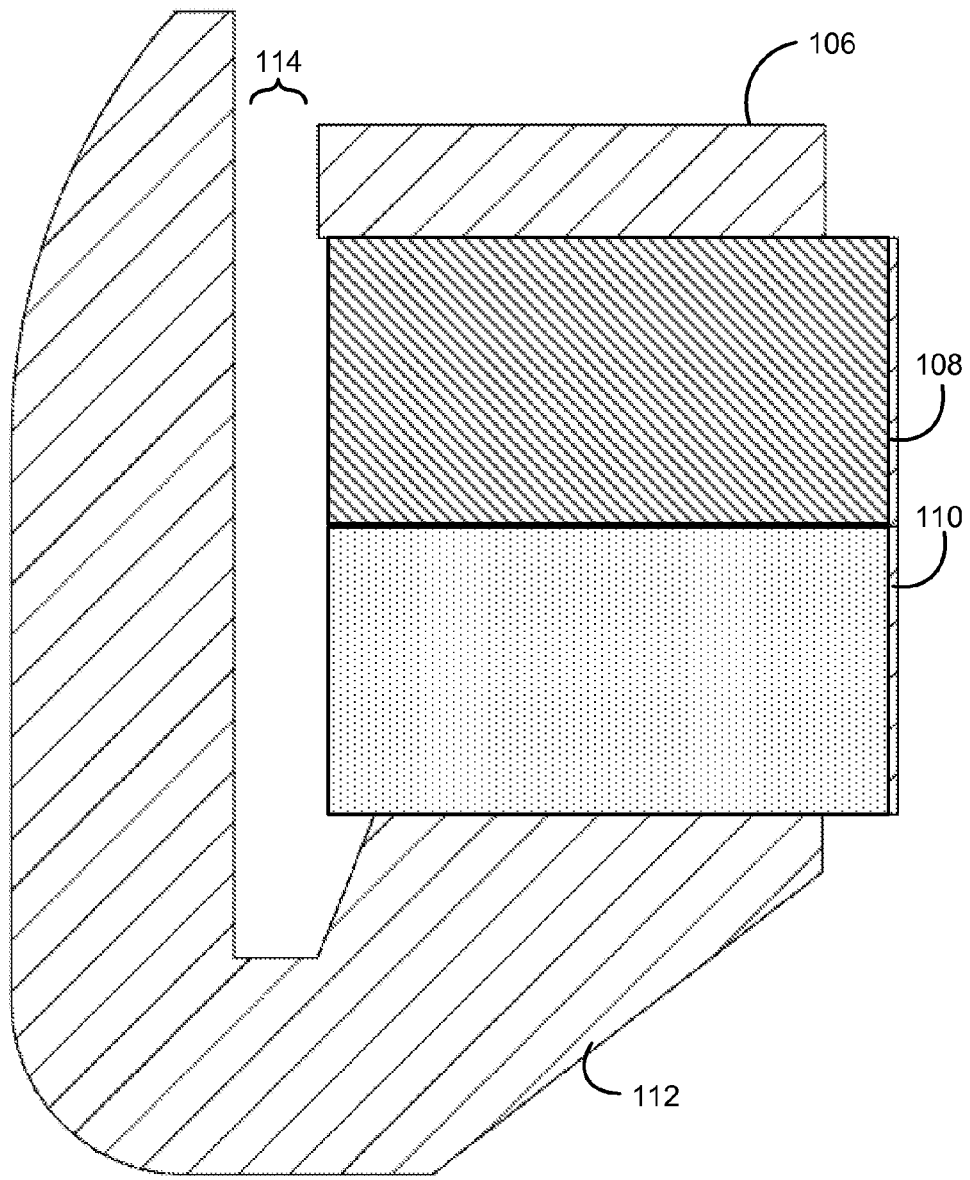
FIG. 2 shows a close up cross sectional illustration of a linear motor geometry, excluding the voice coil, in accordance with an embodiment of the present invention.

FIG. 2 shows a close up cross sectional illustration of the Improved Linear Motor 100 geometry, excluding the Former 102 and Voice Coil 104. Again the Gap Plate 106, Magnets 108 and 110, and Yoke 112 may be seen. In addition, an Air Gap 114 may be more readily identified in this illustration. The Air Gap 114 typically is filled with air; however, in some embodiments the Improved Linear Motor 100 may be in an evacuated environment. Regardless of the substrate filling the Air Gap 114, in general, this portion of the Improved Linear Motor 100 is less permeable to magnetic fields than the Gap Plate 106 and Yoke 112. Thus, the Air Gap 114 may be kept relatively narrow in order to limit magnetic field loss across the Air Gap 114. The Former 102 and Voice Coil 104 may fit into the Air Gap 114 in such a fashion as to enable vertical movement.

Figure 3A:
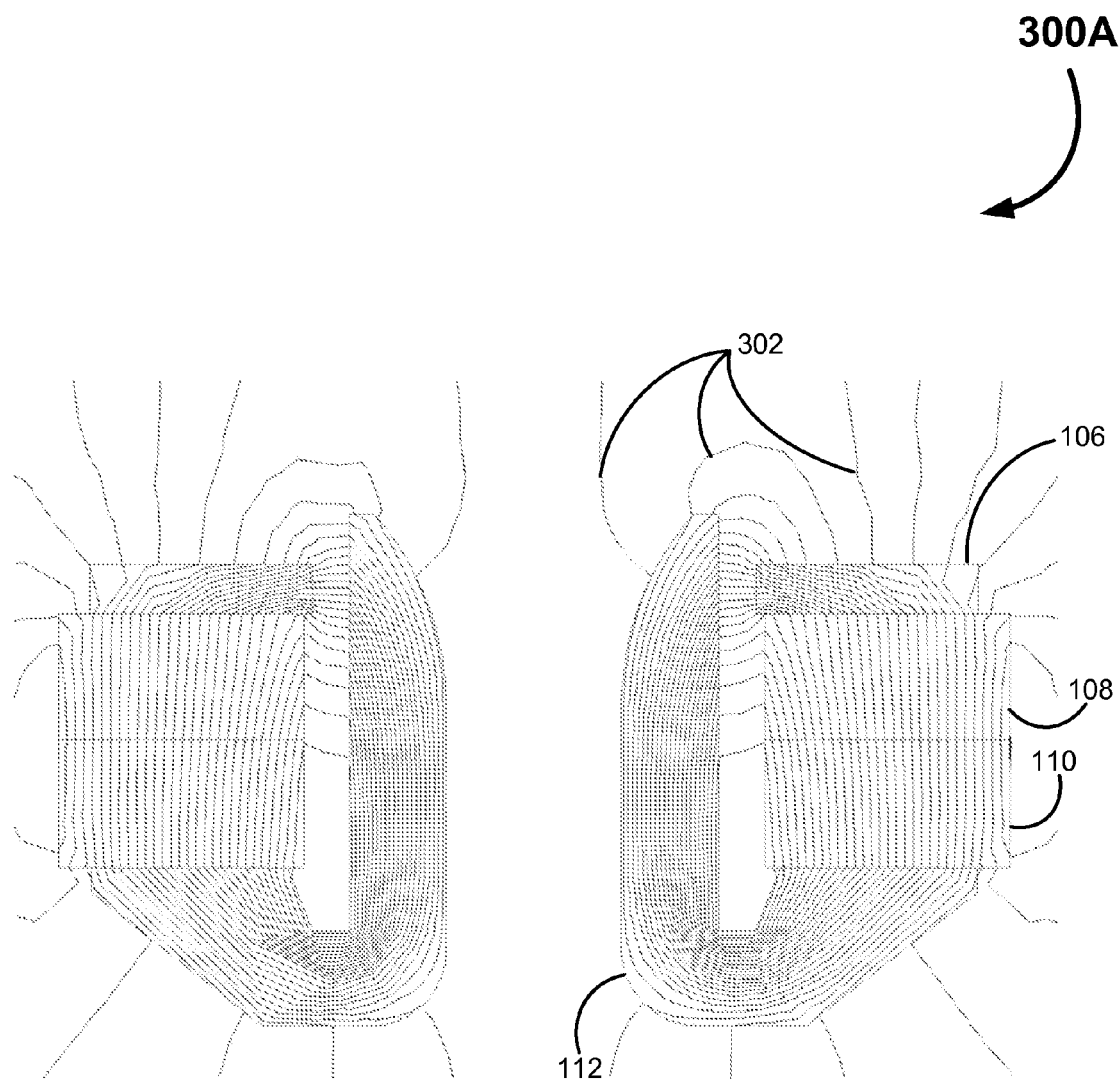
FIGS. 3A and 3B show a cross sectional illustration of the magnetic flux pathways in a linear motor in accordance with an embodiment of the present invention.
Figure 3B:
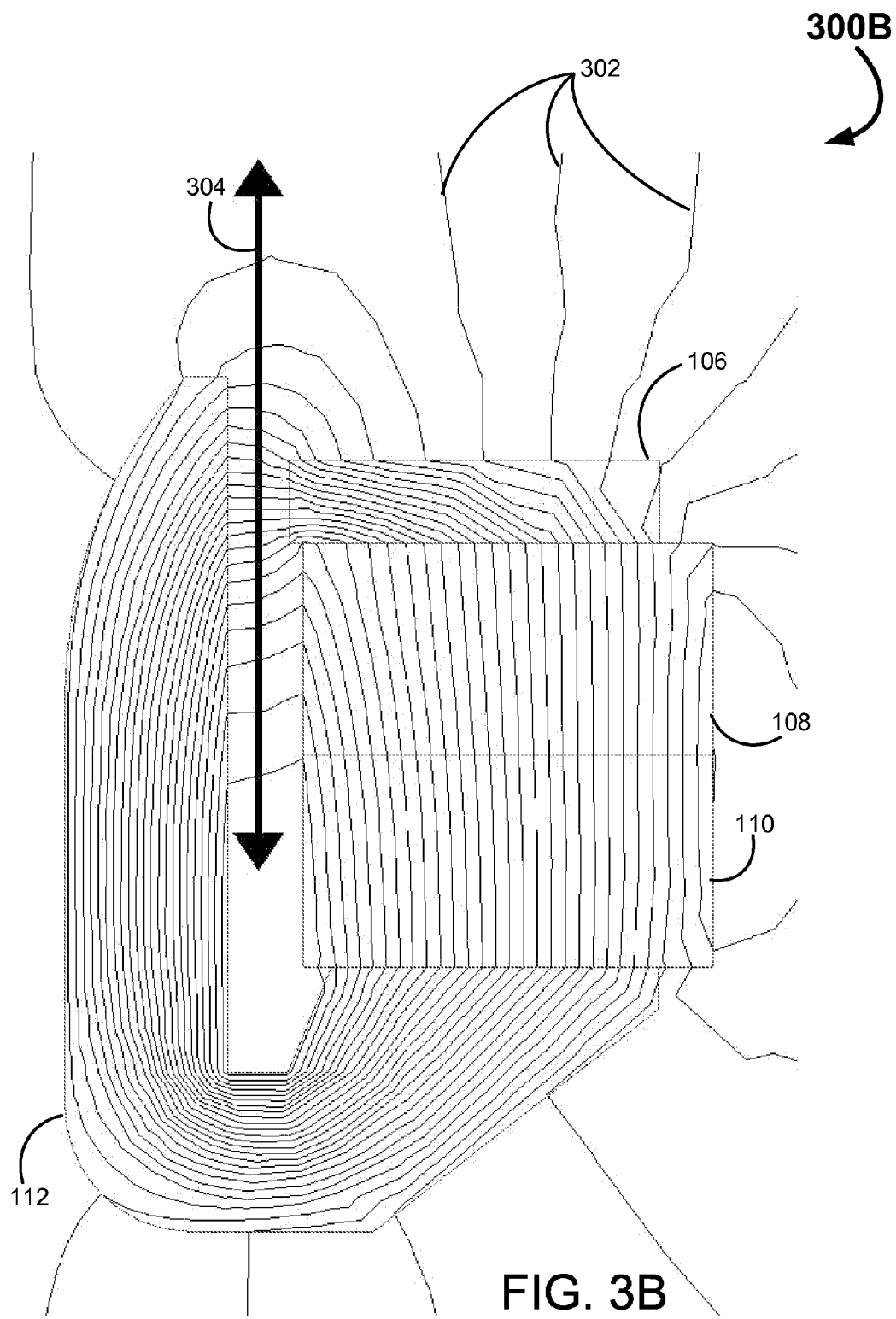

FIGS. 3A and 3B show a cross sectional illustration of the Magnetic Flux Lines 302 in a Improved Linear Motor 100, shown generally at 300A and 300B. The one or more Magnets 108 and 110 may generate a Magnetic Field (B). The Magnetic Flux Lines 302 of the magnetic field generally contours along the steel path of the Gap Plate 106 and Yoke 112 and across the Air Gap 114 which exists between the Gap Plate 106 and the Yoke 112. The concentration of the Magnetic Flux Lines 302 across the Air Gap 114 ensures an efficient Improved Linear Motor 100. However, the distribution of the Magnetic Flux Lines 302 across the Air Gap 114 is not uniform, with a reduction in Magnetic Flux Lines 302 at the edges of the Air Gap 114. Additionally, motion of the linear motor Coil 104 within the Air Gap 114 may be seen at 304.

Figure 3C:
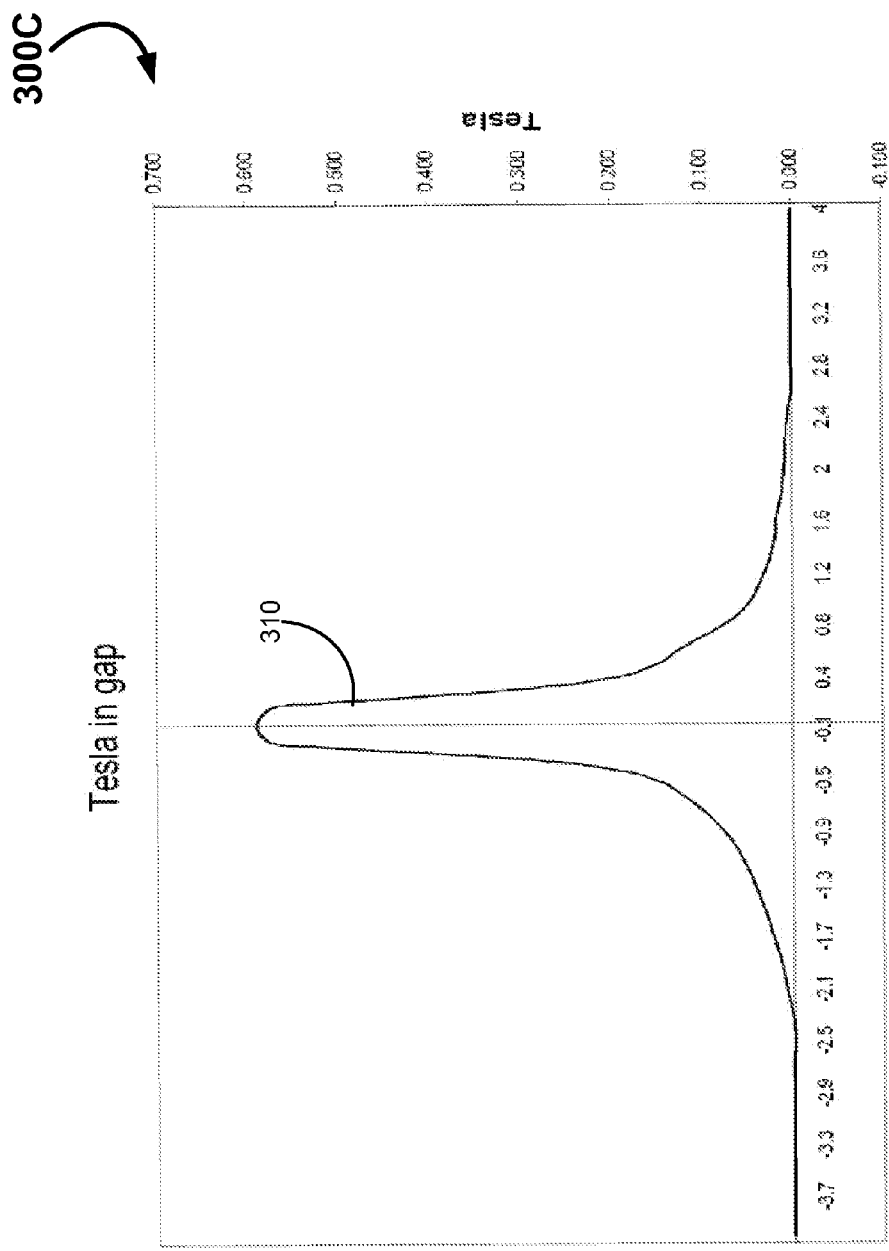
FIG. 3C illustrates a plot of the magnetic field thru the y-axis of the air gap in accordance with an embodiment of the present invention.

FIG. 3C illustrates the Magnetic Field 310 thru the y-axis of the Air Gap 114, shown generally at 300C. Here the non-uniform nature of the Magnetic Field 310 may be clearly seen.

Figure 4A:
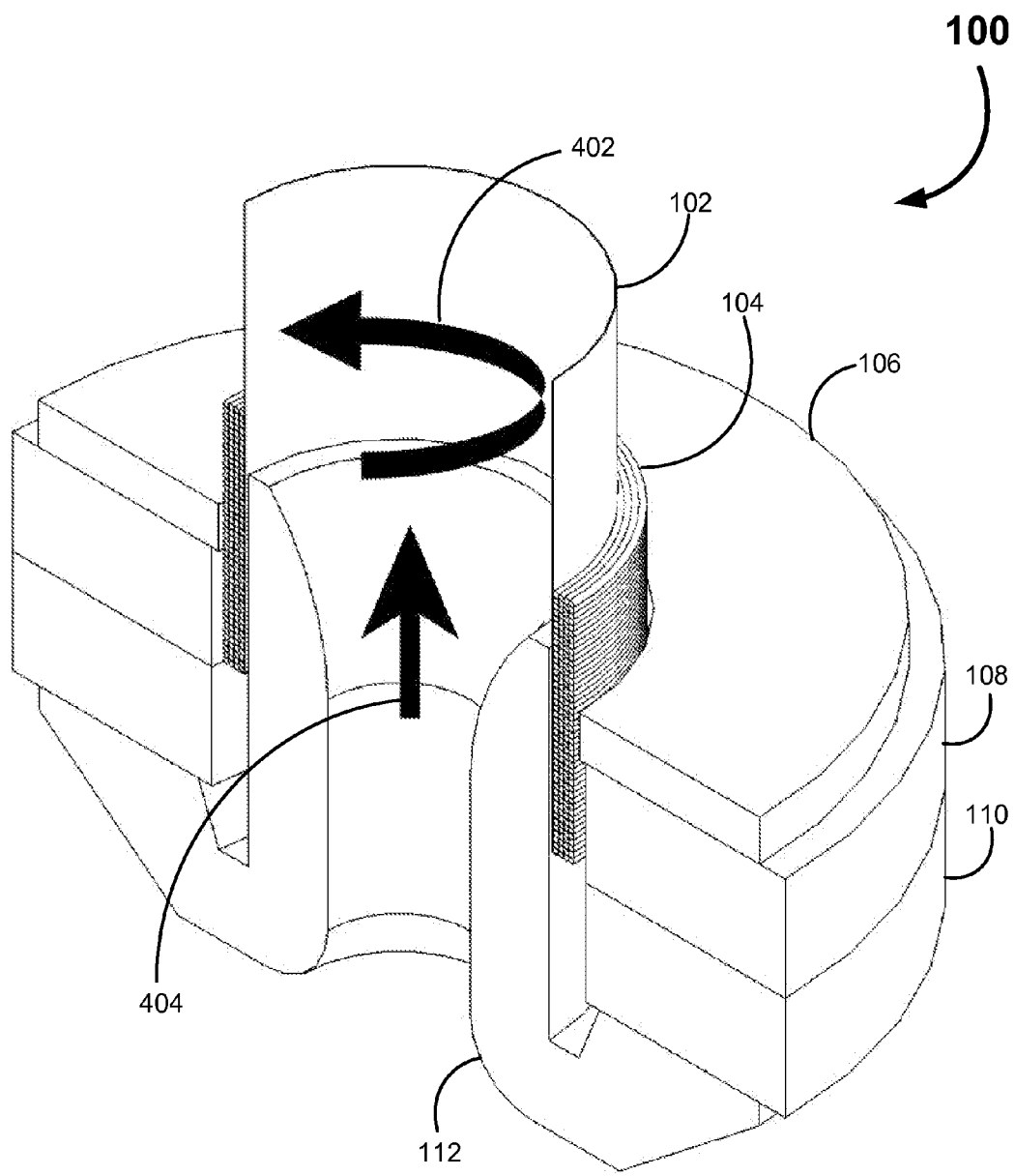
FIG. 4A shows a first isometric cutaway illustration of a linear motor, including force and current indicators, in accordance with an embodiment of the present invention.
Figure 4B:
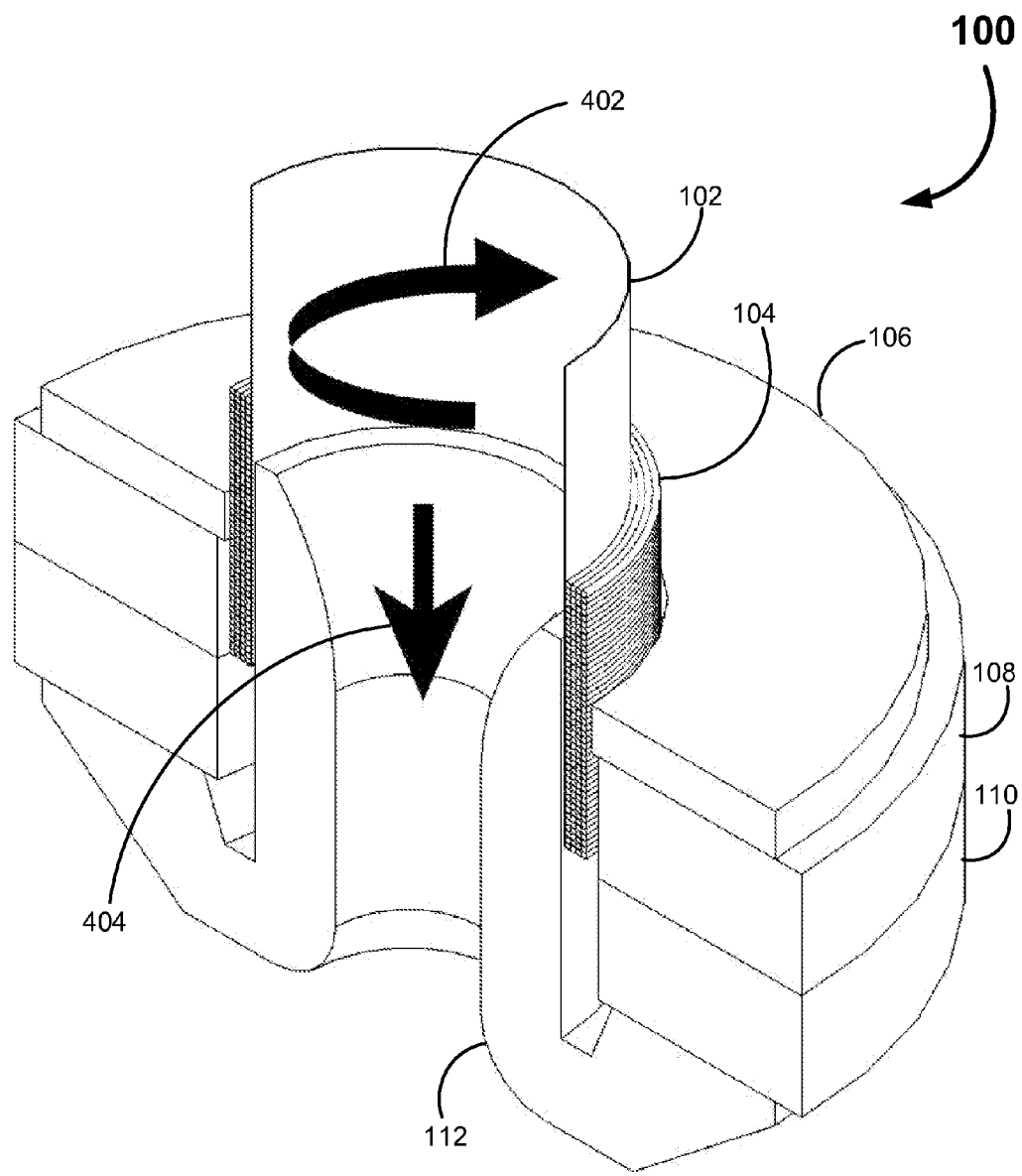
FIG. 4B shows a second isometric cutaway illustration of a linear motor, including force and current indicators, in accordance with an embodiment of the present invention.

FIGS. 4A and 4B show isometric cutaway illustrations of a linear motor, including Force 404 and Current 402 indicators. Again the Gap Plate 106, Magnets 108 and 110, and Yoke 112 may be seen. The Former 102 and Voice Coil 104 may be seen existing within and extending above and below the Air Gap 114. A Current 402 may be applied through the Voice Coil 104.

As Current 402 is driven through the Voice Coil 104, the Voice Coil 104 experiences a Force 404 perpendicular to the current direction. Of note is that the direction of the resulting Force 404 depends upon the direction of the applied Current 402 as well as the direction the magnets 108 and 110 were permanently magnetized as is illustrated by FIGS. 4A and 4B.

The magnetic Force 404 is created from the sum of all the charged partials q multiplied by their drift velocity v crossed with that of the magnetic field B. Thus, $$F = qv \times B$$

Notice this is a vector quantity which acts along the y-axis (up and down) to drive a piston, or diaphragm when AC current is applied.

The force acts at right angles to the magnetic field and the velocity. This force is literally the force acting on the charged particles, which are typically electrons, which then in turn exert a force on the fixed ions which physically move the wire which is attached to a cone or diaphragm.

A cross sectional area of the wire may be denoted as A. This area contains a fixed number n of charge carriers per unit volume, then the total force acting on a length L of wire is simply given as:

$$F = nALqv \times B, \text{ and}$$

$$nALqv = \frac{nALq}{L/v} = \frac{\Delta Q}{\Delta t} = I$$

Notice that the units of nALqv is equivalent coulombs per second, or more formally known as current. Therefore the total force becomes:

F=I·L×B, or current times length crossed with the magnetic field for a uniform magnetic field and a straight wire. This is a fundamental equation for all electric motors, which is well known to those skilled in the art.

Expanding the above equation to account for the non-uniform magnetic fields and curved voice coil results in the following generic force vector:

$$F = \int dF = \int I \cdot dL \times B \; F = \int I \cdot dL \times B$$

The Force 404 is directly related to the cross sectional area of the Voice Coil 104 length L that resides in the Magnetic Flux Lines 302 and the strength of the magnetic field B that defines that Magnetic Flux Lines 302. The amount of wire and the magnetic field are the two fixed variables, and the Current 402 is directly proportional to the voltage. Therefore an increase in voltage (volume) will increase the Current 402 in a fixed resistor (Voice Coil 104) and the Former 102 will move with higher amplitude due to higher Force 404 and larger accelerations.

As has been previously discussed, the non-uniform nature of the magnetic field results in a non-linear Force 404 applied on the Voice Coil 104 as the Voice Coil 104 moves vertically within the Air Gap 114. This non-linear problem arises when the voltage is high, such as at high audio amplitude, or the period is very long (low frequency input), such as for bass audio, which, in either case, allows the displacements to wander beyond linear tolerances. Because the fixed magnetic field is non-uniform with respect to the y-axis, lower density flux lines still catch (couple) much of the conductor in its neutral position. As the Voice Coil 104 moves away from the center of the Air Gap 114 (up or down), less and less of these stray lines catch less and less conductor and the total Force 404 decreases because the BL product decreases with respect to coil position. Previous efforts to linearize this force have succeeded at the expense of efficiency. Thus, current methods reduce distortions (non-linear force) at the expense of sensitivity (efficiency).

Contrary, the present invention provides increased linearity of force while maintaining a high degree of efficiency. The present invention achieves this by introducing a novel Voice Coil 104 which is sectioned. This sectioning enables variable current through each portion of the Voice Coil 104, thereby correcting for the non-uniform magnetic field. For example, current density (J) is defined as:

$$J = \frac{I}{A} = nqv = \text{Ampere/meter}^2 \text{ where } A \text{ is the cross sectional area, } n$$

again is the number of charge carriers and v is the drift speed. Current density is often referred to in applications where there is not necessarily a basic single conductor or uniform conduction path. Indeed if the current density can be manipulated so that less current flows through the portions of the Voice Coil 104 that couple with the most Magnetic Flux Lines 302 and more towards the lower Magnetic Flux Lines 302 regions, then a non-linear current density equation coupled with the non-linear BL curve may be used to create a linear force. The key advantage to this method is that unlike B and unlike L, current (I) may indeed be conserved because it may be simply directed where it is needed more and it can be borrowed from where there is extra.

FIGS. 5 through 14 provide specific examples of the novel Voice Coil 104 for use in the Improved Linear Motor 100.

Figure 5:
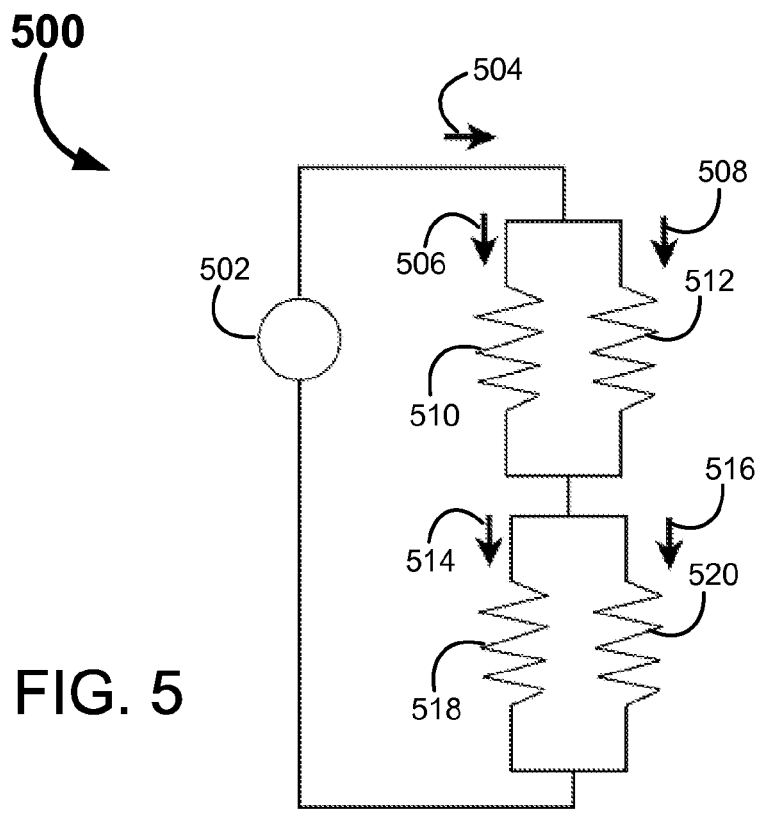
FIG. 5 shows a first exemplary circuit model for the voice coil of the improved linear motor, in accordance with an embodiment of the present invention.

FIG. 5 shows a first exemplary circuit model for the Voice Coil 104 of the Improved Linear Motor 100, shown generally at 500. Ignoring imaginary components of impedance, the stationary Voice Coil 104 may be modeled as simple resistance. Thus, if the Voice Coil 104 is broken apart into smaller resistive pieces, and then strategically wrapped around the Former 102 such that their geometrical layout is conducive of a non-linear current density conductor such that more current flows towards strategic portions of the Voice Coil 104 and less in others, indeed a linear Voice Coil 104 using a current divider with multiple resistive segments can be constructed.

For example, a Voltage Source 502 may provide a fixed voltage. The Voltage Source 502 may include output from a receiver or other audio equipment. A First Resistive Segment 510 and a Second Resistive Segment 512 may be in parallel. The Total Current 504 may split into a First Current Path 506 and a Second Current Path 508. Then, a Third Resistive Segment 518 and Fourth Resistive Segment 520 may run in parallel to one another, yet serial to the First Resistive Segment 510 and Second Resistive Segment 512. The two halves may be run in series for higher and more tolerable final impedance. A Third Current Path 514 and a Fourth Current Path 516 may flow through the Third Resistive Segment 518 and Fourth Resistive Segment 520, respectively. Each Resistor 510, 512, 518 and 520 may correspond to a segment of the Voice Coil 104. In some embodiments, the First Resistive Segment 510 and Fourth Resistive Segment 520 may have lower resistance than the Second Resistive Segment 512 and Third Resistive Segment 518. This resistance may be altered by having shorter lengths of wire of similar material, or by having variable wire materials, or a combination. For example, varying copper and aluminum alloy wires may be used in some embodiments.

Figure 6:
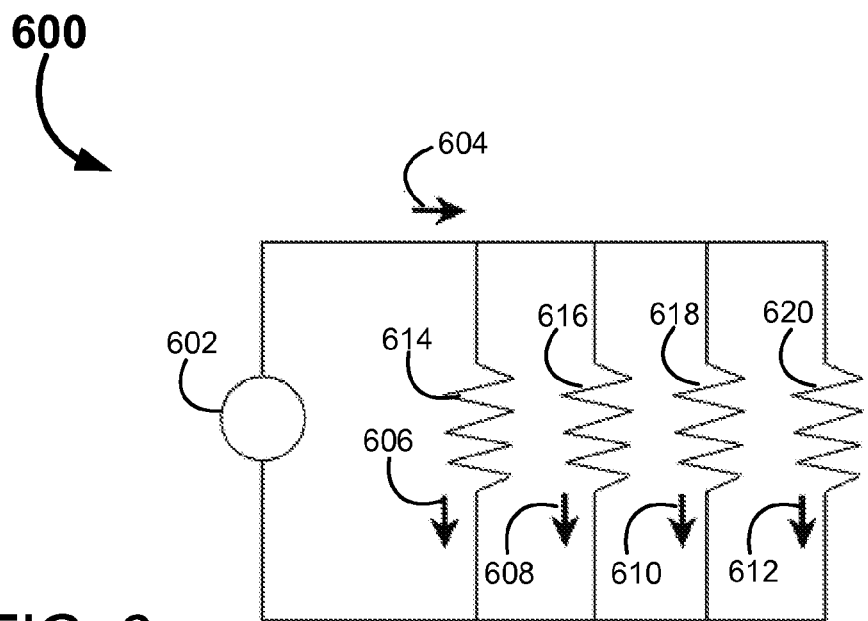
FIG. 6 shows a second exemplary circuit model for the voice coil of the improved linear motor, in accordance with an embodiment of the present invention.

FIG. 6 shows a second exemplary circuit model for the Voice Coil 104 of the Improved Linear Motor 100, shown generally at 600. Rather than having two halves in series, this embodiment runs each Resistive Segment 614, 616, 618 and 620 in parallel. Again, a Voltage Source 602 may be seen. The Total Current 604 may be split across each Current Path 606, 608, 610 and 612 dependent upon each path's resistance.

Again, Each Resistor 614, 616, 618 and 620 may correspond to a segment of the Voice Coil 104. In some embodiments, some Resistor Segments 614, 616, 618 and 620 may have lower resistance than the others. This resistance may be altered by having shorter lengths of wire of similar material, by having variable wire materials, or a combination.

These examples illustrate that specific wires of different resistances are wired together in parallel to draw specific portions of current through each. Each wire that receives more current will, hence, borrow it from the higher resistive wire which provides a conservation principle otherwise not found in a B or L altering linear technique.

In some embodiments, the same conductor materials for each resistive segment may be used. Thus, the resistance of each wire is exactly related to the length of the wires themselves, therefore the length, resistance and geometrical layout of the Voice Coil 104 may be derived all at once.

Figure 7:
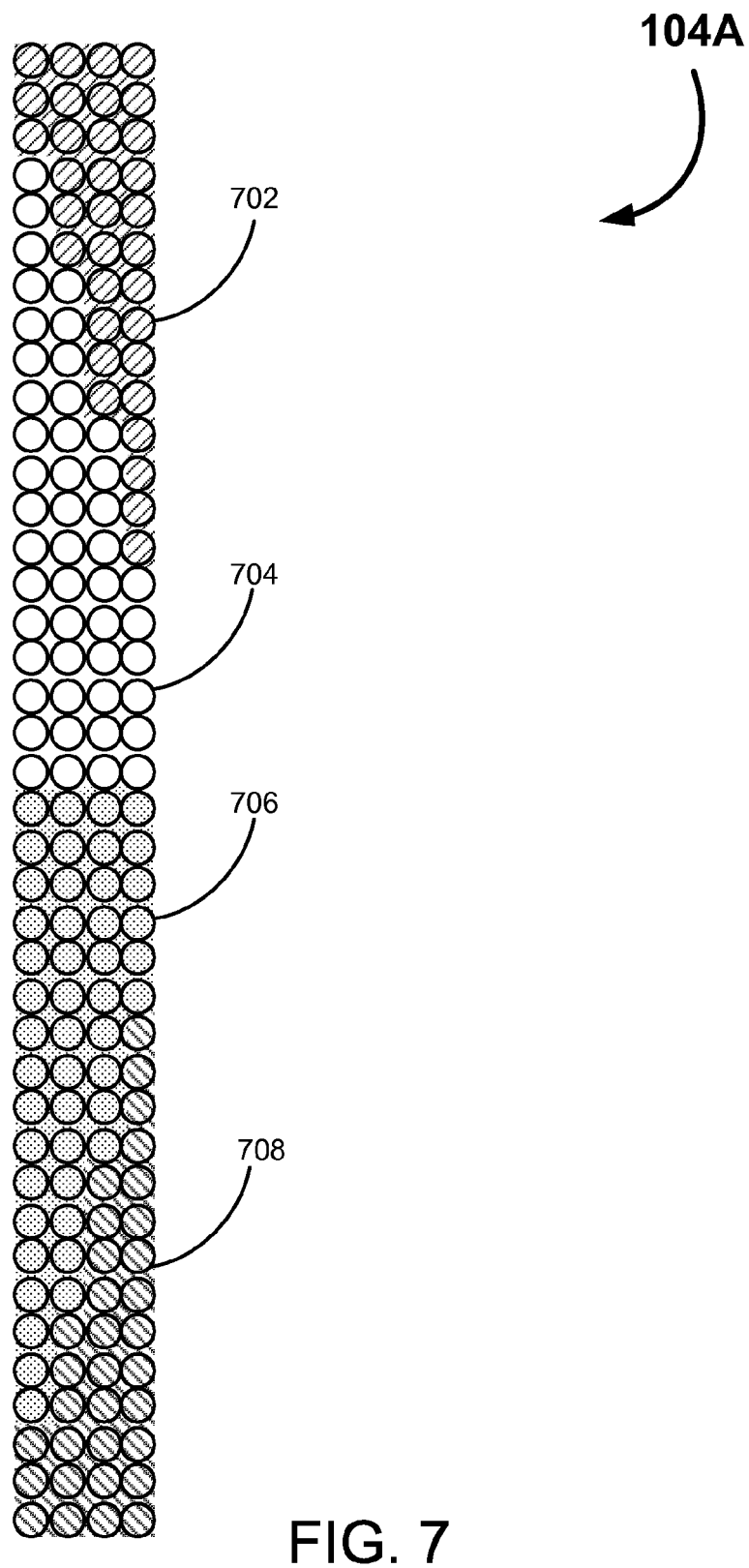
FIG. 7 shows a cross sectional illustration of a first exemplary voice coil of the improved linear motor, in accordance with an embodiment of the present invention.

FIG. 7 shows a cross sectional illustration of a first exemplary Voice Coil 104A of the Improved Linear Motor 100. Each circle is a cross section of the wound wire. Here each Resistive Segment 702, 704, 706 and 708 are identifiable by the shading used. Notice that without this shading, the Voice Coil 104A would look nothing out of the ordinary from a straight wound voice coil. The critical design aspects are the overall cross section and ratio of conductors throughout the horizontal slice of the coil.

The important relationship is each half (702, 704) or (706, 708) must be individually wired in parallel for the variable current density conductor to take effect. The two summed halves can either then be wired in parallel or series depending on ideal amplification requirements. If the halves are of different net lengths, paralleling the entire coil would in fact yield different BLI(X) or Force(x) results.

Figure 8:
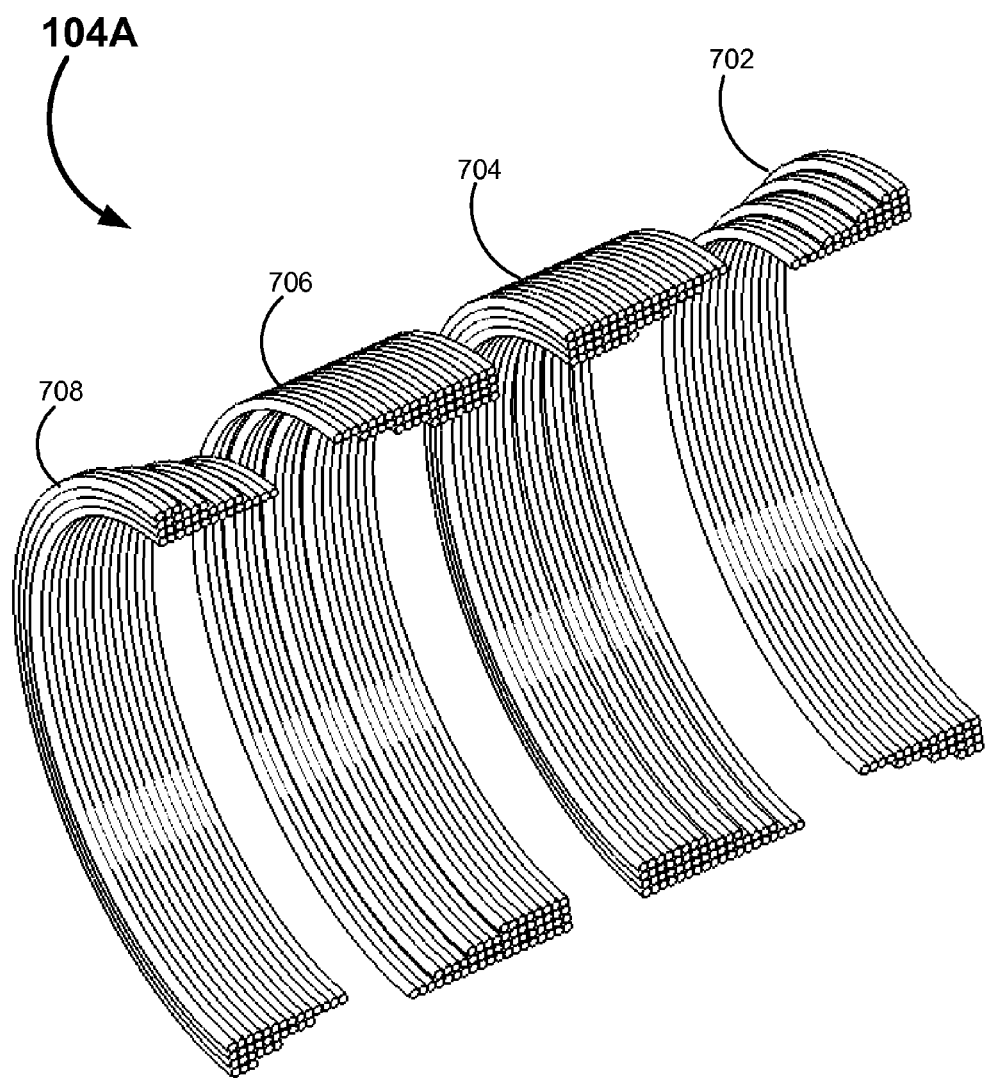
FIG. 8 shows an exploded isometric cutaway illustration of the first exemplary voice coil of the improved linear motor, in accordance with an embodiment of the present invention.

FIG. 8 shows an exploded isometric cutaway illustration of the first exemplary Voice Coil 104A of the Improved Linear Motor 100. In this Figure, each Segment 702, 704, 706 and 708 is wound to a maximum of four layers; however, more or less layers could be used. Additionally, the first and fourth Segment 702 and 708 are and is interlaced down to overlap with its adjacent parallel segment 704 and 706, respectively, in order to create a smooth transitioning current function with only four discrete conductors. In this example, the two middle Segments 704 and 706 are not interlaced with one another for ease of manufacturing purposes.

Figure 9:
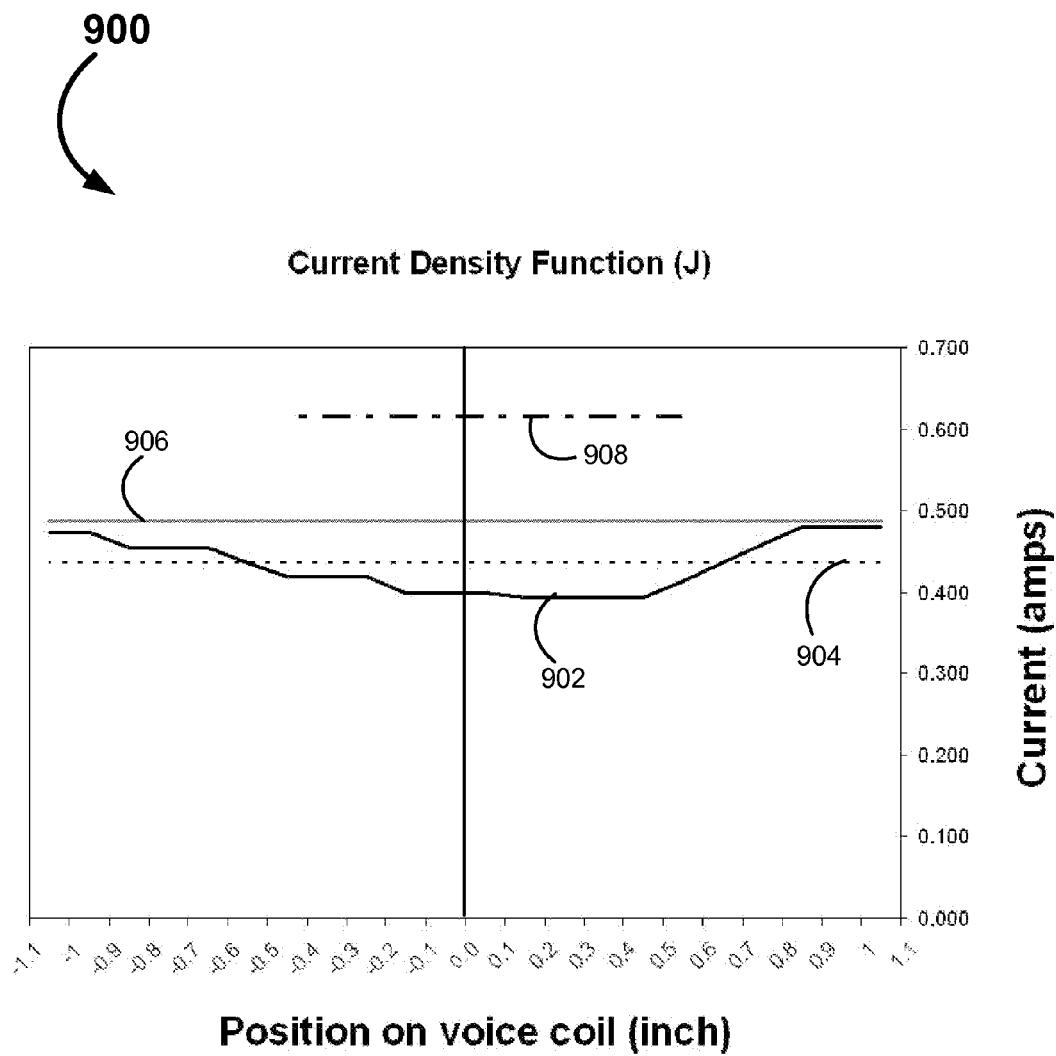
FIG. 9 shows a comparative chart of current density within the first exemplary voice coil of the improved linear motor, in accordance with an embodiment of the present invention.

FIG. 9 shows a comparative chart of current density within the first exemplary Voice Coil 104A of the Improved Linear Motor 100, shown generally at 900. Here, the function of current is not symmetrical about the x =0 vertical line, shown at 902, for the Voice Coil 104A because this particular coil is attempting to make asymmetrical BL correction along the y-axis of the motor's air gap extending several inches both above and below the gap's center (refer to B plot). But the general trend can be observed that there is a higher amount of current towards the ends of the coil and a lower amount of current near the middle.

Line 908 equates to the current in a dual gap design. Line 902 equates to a variable coil design, and line 904 is for a standard overhung coil design. It can be seen that the current functions of all other motors are flat. The current plots in FIG. 9 are for a fixed power load for all examples.

Figure 10A:
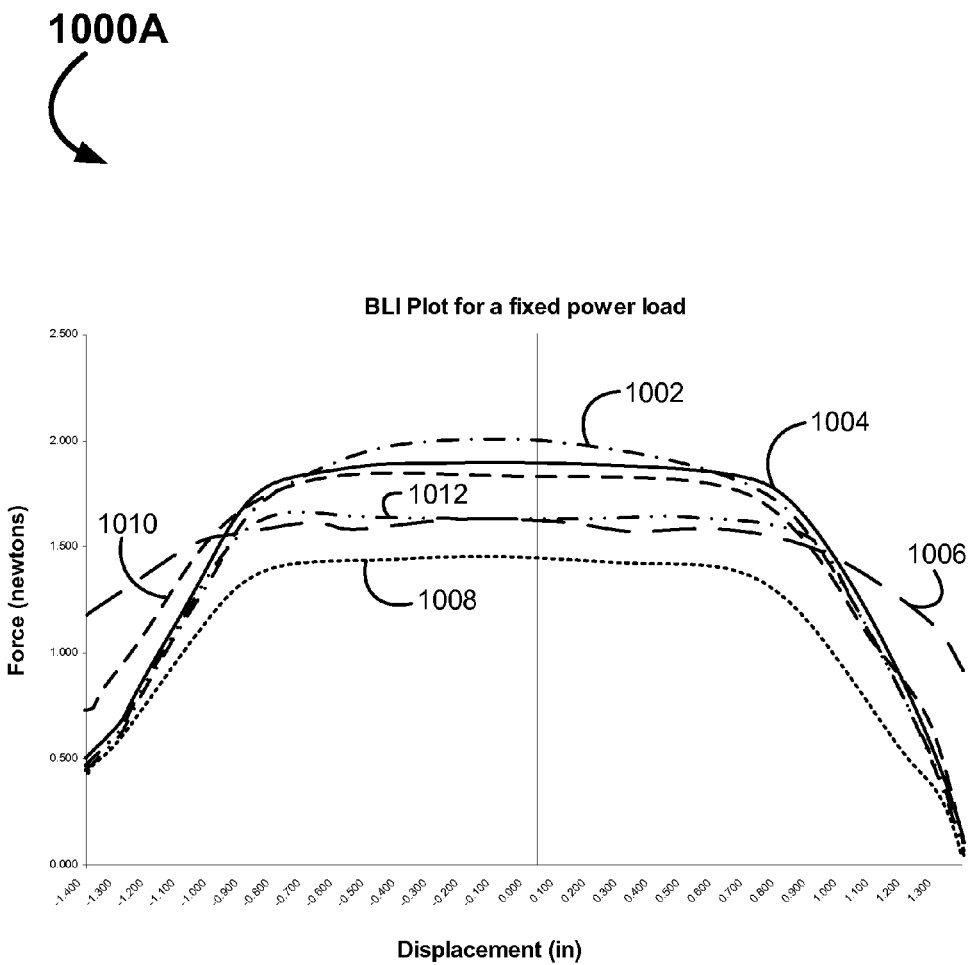
FIG. 10A shows a comparative chart of force versus displacement for the first exemplary voice coil of the improved linear motor, in accordance with an embodiment of the present invention.
Figure 15:
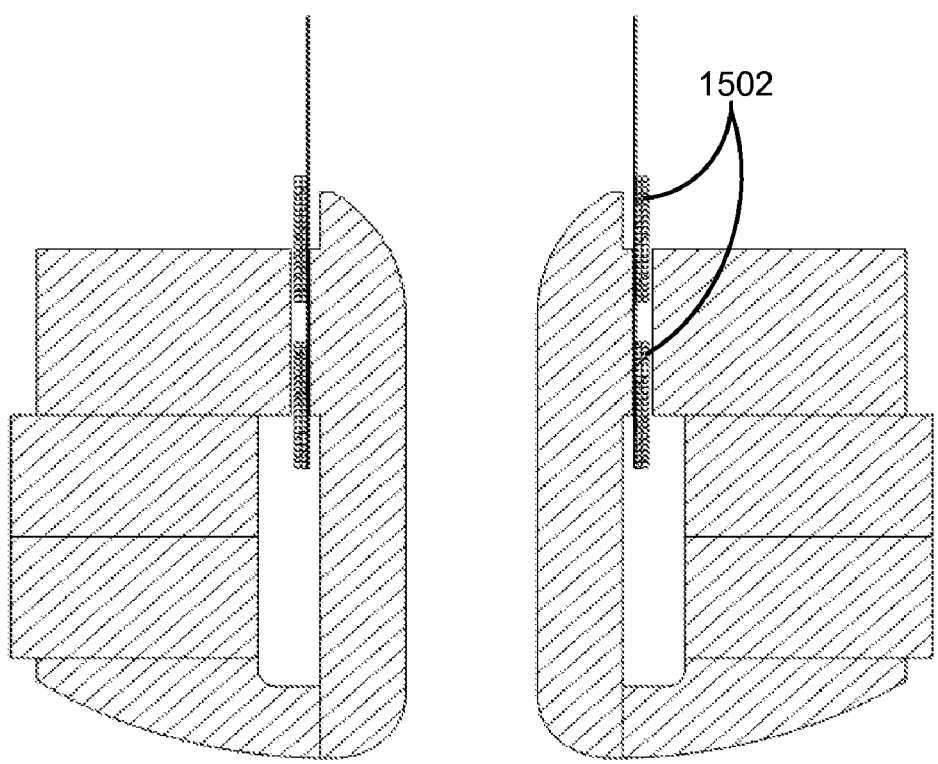
FIG. 15 shows a cutaway illustration of a split coil linear motor.

FIG. 10A shows a comparative chart of force versus displacement for the first exemplary Voice Coil 104A of the Improved Linear Motor 100, shown generally at 1000A. The force versus displacement of the voice coil is plotted for the present invention at 1004. The standard overhung coil is plotted at 1002. The plot at 1006 corresponds to a split coil design. An example of a Split Coil Design 1500 may be found at FIG. 15. As may be seen at 1502, the voice coil is split into two parts.

The plot at 1008 is for a four layer double gap design, and 1010 is for an eight layer equal mass double gap design. An example of a Double Gap Design 1300 may be found at FIG. 13. As may be seen at 1302, the yoke is split into two parts.

Lastly, the 1012 plot corresponds to the variable coil design. An example of a Variable Coil Design 1400 may be found at FIG. 14. As may be seen at 1402, the voice coil is wound at differing thicknesses.

All of the examples demonstrated were modeled with the exact same size magnet and maximum voice coil cross section (with the exception of the 8 layer double gap example), with the exact same wire gauge, gap dimensions and coil length. The examples are all given the same fixed power load to demonstrate relative force differences.

Split Coil 1500 and Variable Coil 1400 have approximately the same motor force. However, the present invention has fewer losses than any method and even exceeds the overhung coil at high displacements. Moreover, Double Gap 1300 designs exhibit asymmetric behavior on the up stroke where the stray flux lines are less dense. Likewise, the standard overhung coil is susceptible to the motor's flux path. Also, while the 8 layer double gap design seems to be very efficient, it also had to use double the L (wire cross section) relative to all other examples which is likely to result in higher motor inductance, as well as a much wider Air Gap 114. Additionally, manufacturers of linear motors may require retooling to effectually make Double Gap 1300 designs. Yet despite these excess in material and manufacturing costs of the Double Gap 1300 design, the present invention still exhibits greater motor efficiency.

Figure 10B:
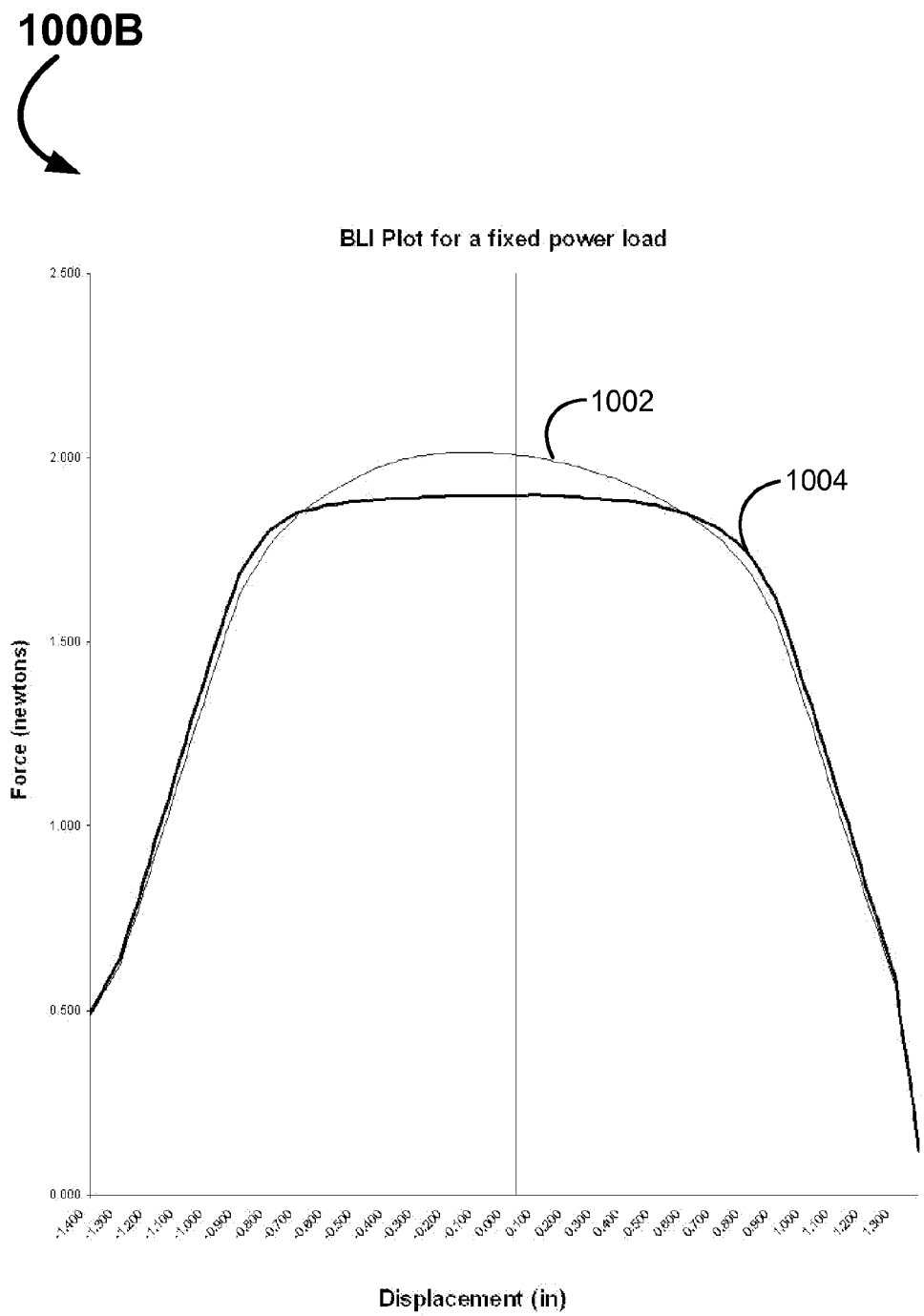
FIG. 10B shows a reference chart of force versus displacement for the first exemplary voice coil of the improved linear motor, in accordance with an embodiment of the present invention.

FIG. 10B shows a reference chart of force versus displacement for the first exemplary Voice Coil 104A of the Improved Linear Motor 100, shown generally at 1000B. Here, the force versus displacement of the voice coil is plotted for the present invention at 1004. The standard overhung coil is plotted at 1002. Other linear motor designs are not plotted on this chart for ease of viewing. Again, note the present invention's linear force distribution across a wide range of coil displacement.

Figure 11:
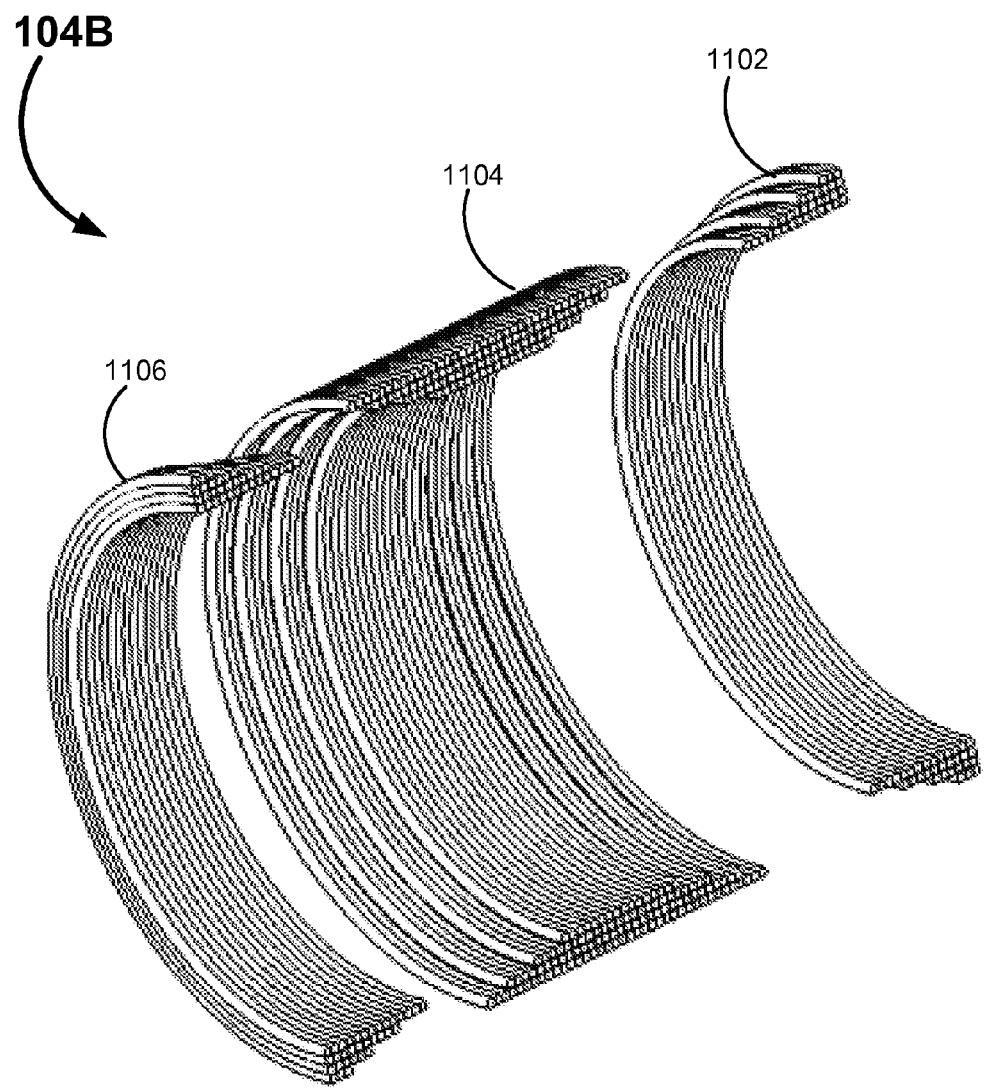
FIG. 11 shows an exploded isometric cutaway illustration of a second exemplary voice coil of the improved linear motor, in accordance with an embodiment of the present invention.

FIG. 11 shows an exploded isometric cutaway illustration of a second exemplary Voice Coil 104B of the Improved Linear Motor 100. This model would be the simplest to manufacture because it uses one less wire segment, but it also forfeits wiring options for end users. Instead of using four wire segments, three wire Segments 1102, 1104 and 1106 could be used in this configuration, but they would have to be wired in parallel for the coil to be linear.

The resistive segment proportions might necessarily be of different lengths and resistances to form a linear force curve. In this example, current may be in higher concentration on the outer Segments 1102 and 1106.

Figure 12:
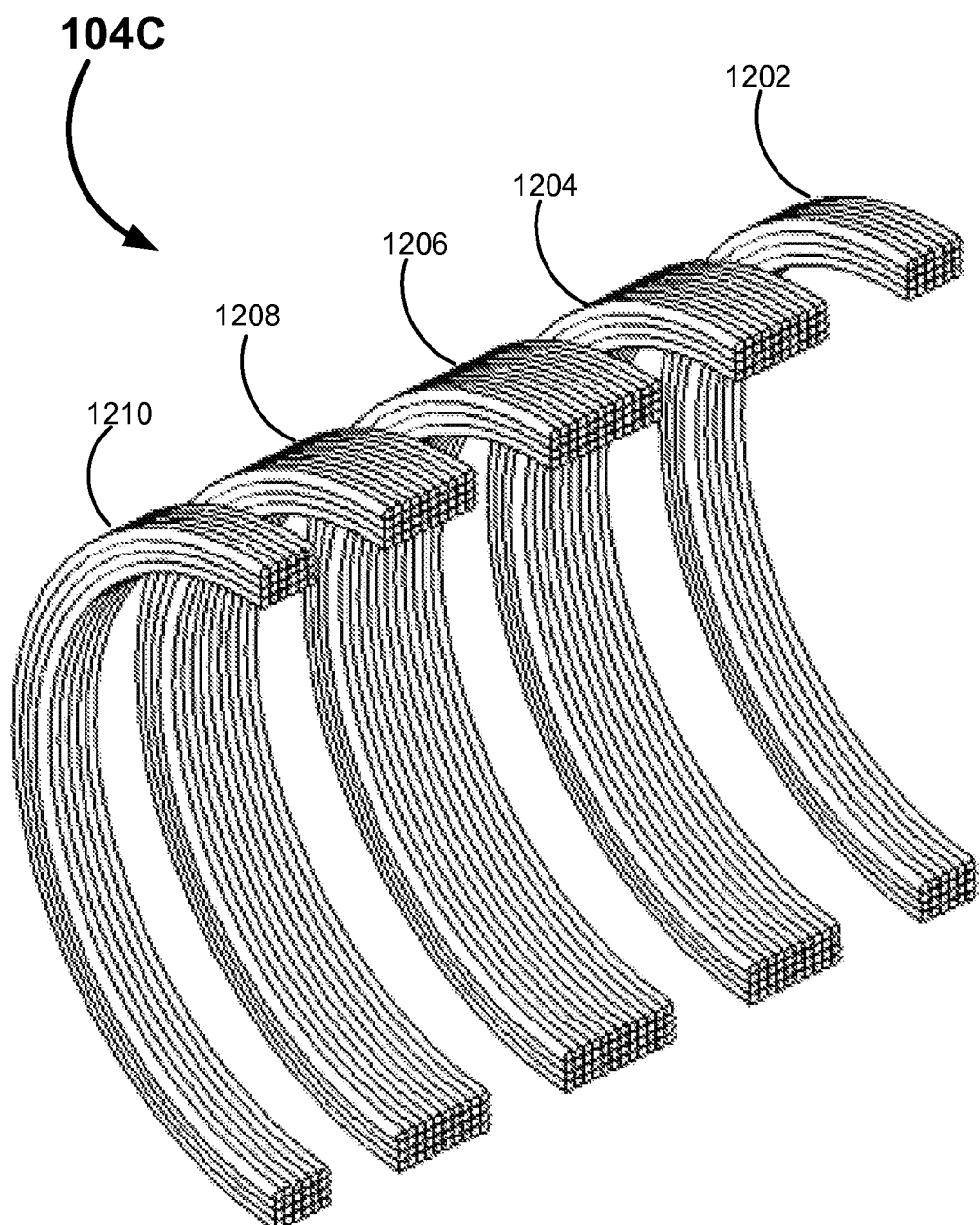
FIG. 12 shows an exploded isometric cutaway illustration of another exemplary voice coil of the improved linear motor, in accordance with an embodiment of the present invention.
Figure 13:
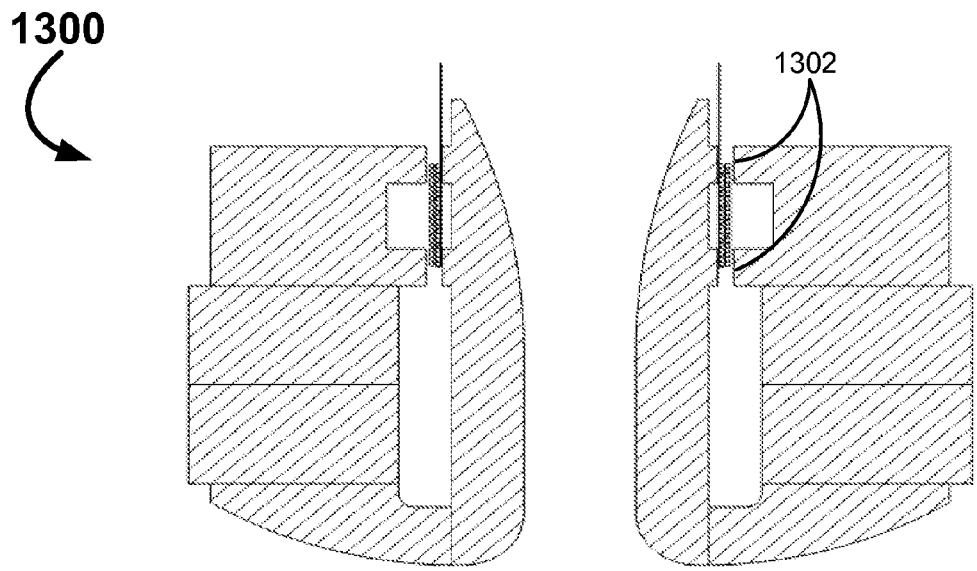
FIG. 13 shows a cutaway illustration of a double gap linear motor.
Figure 14:
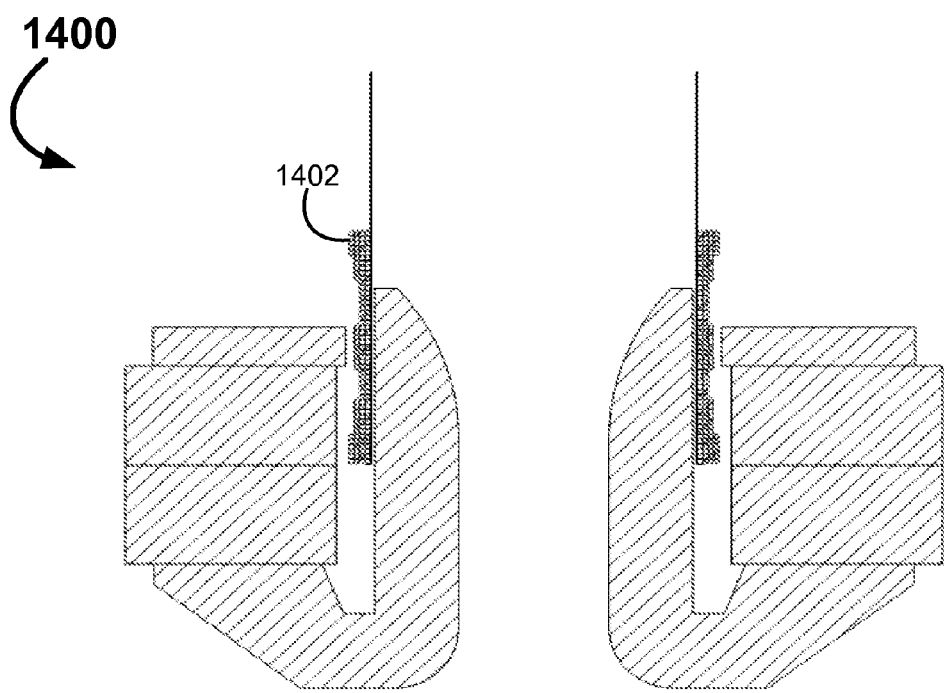
FIG. 14 shows a cutaway illustration of a variable coil linear motor.

FIG. 12 shows an exploded isometric cutaway illustration of another exemplary Voice Coil 104C of the Improved Linear Motor 100. In this examples, there is no need not to overlap or interlace coils with each other as the resistive Segments 1202, 1204, 1206, 1208 and 1210 would in fact have enough definition to form a smooth enough J (current density) function to make linear corrections to a BL curve. However, interlacing may be included if desired. Of note is that the more segments used, the lower and more troublesome the impedance of the voice coil would be.

It is important to understand that these are just a few convenient methods for constructing a variable current density voice coil. Flat lead wires may be fed through the inside of the coil or the outside of the coil much the way an edge wound coil is terminated. Additionally, the wiring configuring may be reversed, thereby deriving a standard overhung voice coil. For example, if all the segments were wired in series instead of parallel, the current running through the Voice Coil 104 would be constant and the coil could, in fact, revert back to a standard coil. Hence the coil could run in linear or non-linear modes.

In summary, systems and methods for an improved linear motor is provided. While the disclosed improved linear motor has been discussed for use in acoustic applications, it is also understood that the present improved linear motor has beneficial use in a wide range of ballistic, transportation and mass acceleration applications. For example, such an improved linear motor may be of use for generating constant acceleration forces for transportation needs.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. An improved linear motor for linearizing force on a voice coil as a function of displacement, useful in conjunction with a voltage input, the improved linear motor comprising:
    a yoke configured to be relatively permeable to a magnetic field;
    a gap plate configured to form an air gap with the yoke, wherein the gap plate is relatively permeable to the magnetic field, and wherein the air gap is relatively narrow;
    at least one magnet configured to couple to the yoke and the gap plate, wherein the at least one magnet generates the magnetic field across the air gap;
    a former configured to engage the air gap, wherein the former is enabled to move in a vertical direction; and
    a voice coil configured to be coupled to the former, wherein the voice coil includes at least two segments of differing electrical resistance, and wherein the at least two segments are substantially comprised of electrically-conductive and non-magnetic material, and further wherein the cross section of the at least two segments is of substantially equal area across the entire lengths, and further wherein the winding volume of the at least two segments is uniform across the voice coil.

2. The improved linear motor of claim 1, wherein the resistances of the at least two segments of the voice coil causes force on the voice coil to be uniform regardless of displacement of the voice coil within a functional range.

3. The improved linear motor of claim 2, wherein the voice coil includes four resistive segments.

4. The improved linear motor of claim 3, wherein the voice coil segments include a top outside segment, a top center segment, a bottom center segment and a bottom outside segment.

5. The improved linear motor of claim 4, wherein the top outside segment and the bottom outside segment have a lower resistance than the top center segment and the bottom center segment.

6. The improved linear motor of claim 4, wherein the top outside segment interlaces with the top center segment, and wherein the bottom center segment interlaces with the bottom outside segment.

7. The improved linear motor of claim 2, wherein the voice coil includes three resistive segments.

8. The improved linear motor of claim 7, wherein the voice coil segments include a top outside segment, a center segment, and a bottom outside segment.

9. The improved linear motor of claim 8, wherein the top outside segment and the bottom outside segment have a lower resistance than the center segment.

10. The improved linear motor of claim 8, wherein the top outside segment and the bottom outside segment interlace with the center segment.

11. An improved voice coil for linearizing force as a function of displacement, useful in conjunction with a linear motor, the improved voice coil comprising:
    a top resistive segment comprising a wire of a first given length;
    a middle resistive segment comprising a wire of a second given length, and wherein the top resistive segment and middle resistive segment are wired in parallel; and
    a bottom resistive segment comprising a wire of a third given length, wherein the top resistive segment, middle resistive segment resistive, and the bottom resistive segment are wired in parallel, and wherein the top resistive segment, the middle resistive segment and the bottom resistive segment are substantially comprised of electrically-conductive and non-magnetic material, and further wherein the cross section of the top resistive segment, the middle resistive segment and the bottom resistive segment are all of substantially equal area across the entire lengths, and further wherein the winding volume of the segments is uniform across the voice coil.

12. The improved voice coil of claim 11, wherein the resistances of the resistive segments depend upon length of each wire comprising said segment.

13. The improved voice coil of claim 12, wherein the voice coil is enabled to vertically displace within the linear motor.

14. The improved voice coil of claim 13, wherein each wire length is configured to causes force on the voice coil to be uniform when a current is applied, regardless of displacement of the voice coil within a functional range.

15. The improved voice coil of claim 11, wherein the top resistive segment interlaces with the middle resistive segment, and wherein the bottom resistive segment interlaces with the middle resistive segment.

16. The improved voice coil of claim 11, wherein the resistances of the resistive segments depend upon material composition of each said segment, and wherein the resistive segments are comprised of copper and aluminum.

17. The improved voice coil of claim 11, wherein the middle resistive segment includes a top center segment of a fourth given length and a bottom center segment of a fifth given length.

18. The improved voice coil of claim 17, wherein the top center segment and the bottom center segment are wired in parallel.

19. The improved voice coil of claim 11, wherein the voice coil includes a plurality of resistive segments.

20. An improved linear motor for linearizing force on a voice coil as a function of displacement, useful in conjunction with a voltage input, the improved linear motor comprising:
a yoke configured to be relatively permeable to a magnetic field;
a gap plate configured to form an air gap with the yoke, wherein the gap plate is relatively permeable to the magnetic field, and wherein the air gap is relatively narrow;
at least one magnet configured to couple to the yoke and the gap plate, wherein the at least one magnet generates the magnetic field across the air gap;
a former configured to engage the air gap, wherein the former is enabled to move in a vertical direction; and
a voice coil configured to be coupled to the former, wherein the voice coil includes at least two segments of differing electrical resistance, and wherein the at least two segments are comprised of substantially similar material, and further wherein the cross section of the at least two segments is of substantially equal area, and further wherein the winding density of the at least two segments is uniform across the voice coil.

* * * * *